United States Patent [19]

Phillippi et al.

[11] Patent Number: 4,856,338
[45] Date of Patent: Aug. 15, 1989

[54] TECHNIQUE FOR NULL BALANCING FLUIDIC CIRCUITS

[75] Inventors: R. Michael Phillippi, Highland; Francis M. Manion, Rockville, both of Md.

[73] Assignee: The United States of America as represented by the Secretary of the Army, Washington, D.C.

[21] Appl. No.: 252,944

[22] Filed: Oct. 3, 1988

[51] Int. Cl.$^4$ ............................ F15C 4/00; G01L 7/00
[52] U.S. Cl. ........................................ 73/701; 137/557; 137/804
[58] Field of Search ................. 73/700, 701; 137/804, 137/835, 557

[56] References Cited

U.S. PATENT DOCUMENTS

| | | | |
|---|---|---|---|
| 4,253,495 | 3/1981 | Mon | 137/833 |
| 4,276,895 | 7/1981 | Drzewiecki | 137/835 |
| 4,369,811 | 1/1983 | Manion et al. | 137/819 |
| 4,407,153 | 10/1983 | Furlong et al. | 137/804 |
| 4,501,293 | 2/1985 | Furlong et al. | 137/804 |

Primary Examiner—Donald O. Woodiel
Attorney, Agent, or Firm—Saul Elbaum; Guy M. Miller; Muzio B. Roberto

[57] ABSTRACT

A null balanced fluidic sensing system that is less susceptible to pressure supply disturbances includes sensing and amplifying elements in a closed loop arrangement. The differential output of the sensor, developed as a result of an input stimulus, is fed into the inputs of a single sided amplifier. The output of the amplifier is used as a source of supply for the sensor. This closed loop arrangement uses the null offset characteristics of the elements to create a null balanced fluidic sensing system.

7 Claims, 3 Drawing Sheets (a) SENSOR (b) GAIN BLOCK (a) CIRCUIT SCHEMATIC (b) SPS CHARACTERISTIC

TECHNIQUE FOR NULL BALANCING FLUIDIC CIRCUITS

RIGHTS OF THE GOVERNMENT

The invention described herein may be manufactured, used and licensed by or for the United States Government for Governmental purposes without payment to us of any royalty therein.

BACKGROUND OF THE INVENTION

1. Field of the Invention

The present invention relates to a technique for designing fluidic sensing circuits that exhibit constant performance characteristics independent of power supply noise or drift.

2. Description of the Prior Art

Designers of high sensitivity, high dynamic range, open loop, fluidic systems are confronted with obstacles in obtaining constant performance due to power supply noise and drift. One of the major problems from obtaining constant performance in laminar fluidic systems concerns the null offset of jet deflection sensors and amplifiers. Jet flows within a fluidic amplifier should be such that equal output pressures are obtained in both its output ports when there is no difference at its control ports. However, due to various nonlinearities in the device itself, a difference in output pressure is often seen even though there is no difference in pressure at the input or control ports. This difference in output, in the absence of a difference in pressure at the input, is called null offset. This null offset varies as the supply flow to the particular device varies. As a result of this null offset characteristic in laminar flow fluidic devices, signal errors are produced by supply noise and pressure variations, which for high gain systems can be quite large. The use of a highly regulated pressure supply would be desirable but is extremely difficult to attain and is cost prohibitive.

Previous attempts to overcome the null offset problem in sensors and amplifiers have included better fabrication techniques with the purpose to eliminate geometrical imperfections in the devices. A fine blanking technique described in Mon, U.S. Pat. No. 4,253,495, has been used to eliminate such imperfections, however, these devices still exhibit a null offset due to the difficulty in producing a perfectly symmetrical device. Consequently, signal errors are still produced when the supply flow varies.

Another technique to reduce null offset in fluidic systems is described in Manion et al. U.S. Pat. No. 4,369,811. This technique uses a trim circuit utilizing two resistors at the control points of the device. Nevertheless, there exists a need for fluidic systems that can sense a variety of parameters such as temperature, gas concentration, viscosity, density etc., and that are insensitive to power supply noise and pressure variations. The use of null balance, closed loop systems to suppress similar disturbances is well known in the field of electronics but has not been devised for implementing this concept in the field of fluidics.

SUMMARY OF INVENTION

Accordingly, it is an object of the present invention to provide closed loop fluidic sensing circuits that have reduced sensitivity to pressure supply disturbances.

It is another object of the invention to provide fluidic sensing circuits that have improved signal-to-noise ratios.

It is still a further object of the invention to provide fluidic sensing circuits with enhanced frequency response.

It is still another object of the invention to provide precision sensing circuits that use non-critical, less expensive fluidic elements without degrading performance.

These and other objects of the invention are achieved by designing a null balanced fluidic system comprising an amplifier and sensor in which the null offset characteristics, of the sensing element and gain elements, perform a reference comparator function in a closed loop arrangement. The differential output of the sensor, developed as a result of an input stimulus, is fed into the inputs of a single sided amplifier. The output of the amplifier, or system output, is used as a source of supply for the sensor. The null offset characteristics of the elements create a null balance circuit operating point that is less susceptible to power supply noise and variations than a comparable open loop fluidic circuit.

The above and other objects, features and advantages of the present invention will be better understood from the following detailed description taken in conjunction with the accompanying drawings.

DESCRIPTION OF THE PREFERRED EMBODIMENTS

Figure 1:
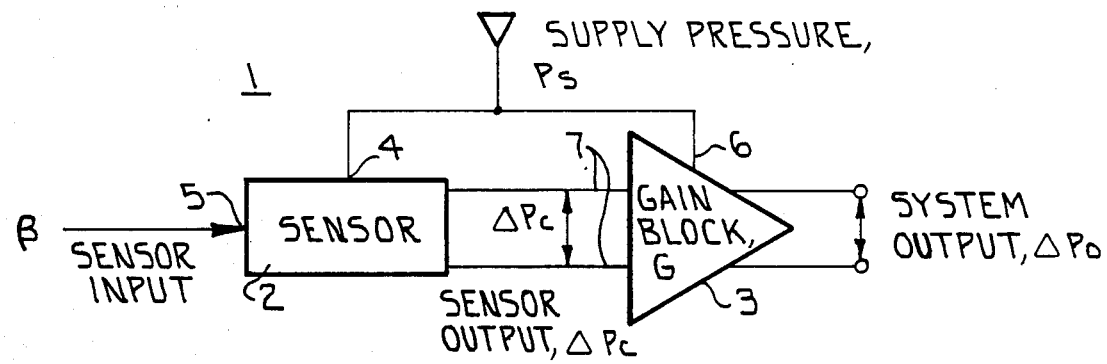
FIG. 1 shows a schematic of a typical open loop fluidic sensor circuit.

FIG. 1 shows an open loop fluidic sensor circuit 1 with a sensor 2 and amplifier or gain section 3 both supplied by pressure $P_s$. The sensor 2 has a supply input 4 and generates a differential fluidic output $\Delta P_c$ as a function of an input stimulus of rate $\beta$ shown as input 5. The amplifier section 3 has a supply input 6 and signal inputs 7, which take the differential output $\Delta P_c$ generated by the sensor 2 and amplifies it to a differential system output signal $\Delta P_0$.

Figure 2:
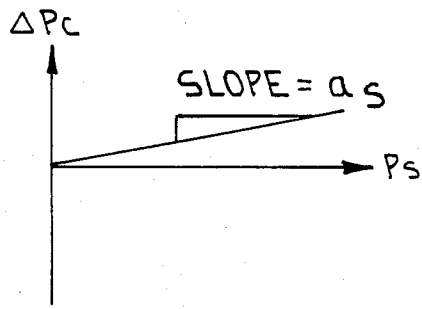
FIG. 2 shows a null offset characteristic power supply pressure, $P_s$, versus differential output, $\Delta P_c$, of a typical fluidic sensor.
Figure 3:
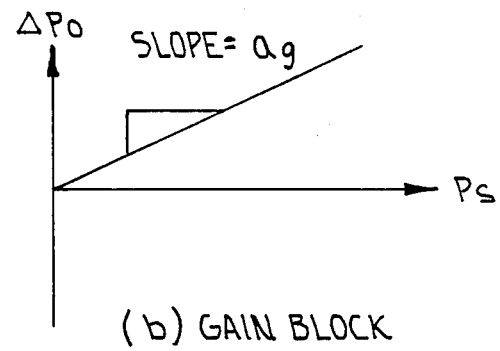
FIG. 3 shows a null offset characteristic power supply pressure, $P_s$, versus differential output, $\Delta P_o$ of a typical fluidic amplifier.

The null offset characteristic of the sensor element 2, as shown in FIG. 2, demonstrates that with no input stimulus the null offset, indicated by $\Delta P_c$ increases as supply pressure increases. The gain section 3 also exhibits a null offset, indicated by $\Delta P_o$, as supply pressure increases as shown in FIG. 3.

Figure 4:
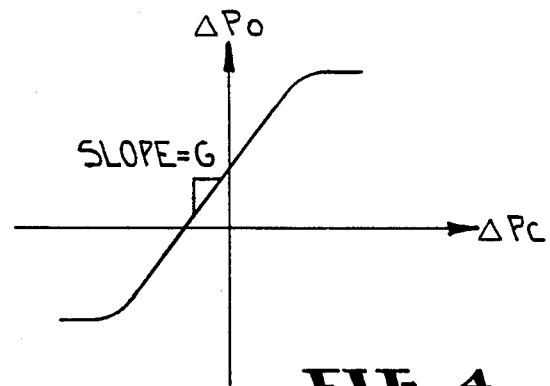
FIG. 4 shows a differential gain characteristic with null offset and gain G of an amplifier or gain section.

The differential gain section characteristic with null offset and gain G is shown in FIG. 4. It can thus be seen that for an open loop fluidic sensor circuit 1, a change or drift of $P_s$ from a set value, denoted as $P_{s'}$ will produce a signal error in system output of:

$$\text{Signal error} = P_s' a_s G + P_s' a_g \quad (1).$$

This error from null offset can be large for high gain systems.

Figure 5:
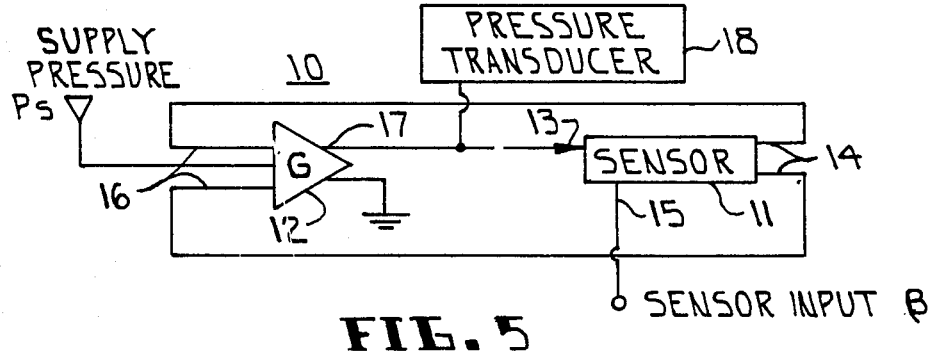
FIG. 5 shows a schematic of a closed loop fluidic sensor circuit in accordance with the present invention.
Figure 6:
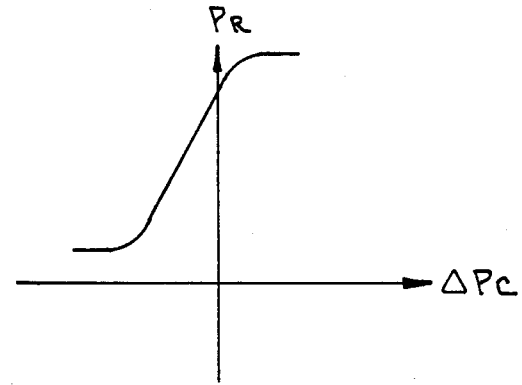
FIG. 6 shows a transfer characteristic of a single sided gain section.

FIG. 5 shows a closed loop null balance fluidic circuit 10 with a sensor 11 and gain block section 12. The sensor 11 has a supply input 13 and generates a differential fluidic output $\Delta P_c$ at output ports 14, as a function of an input stimulus $\beta$ shown as input 15. The gain block section 12 receives the differential output signal $\Delta P_c$ generated by the sensor 11, at input ports 16, and amplifies the signal to a single system output signal 17. The system output pressure signal, which is a function of the input stimulus to the sensor 11, can be measured by any number of well known pressure transducers 18. The gain section is configured as a single sided gain section (i.e., one of the differential outputs is grounded) with its transfer characteristic shown in FIG. 6. The null offset within the gain block 12 is evident from the asymmetry of the output $P_R$ with respect to the ordinate. The null offset within the sensor 11 remains identical to that shown in FIG. 2. The output of the gain block 17 is used not only as the system output but as the supply to the sensor 11.

Figure 7:
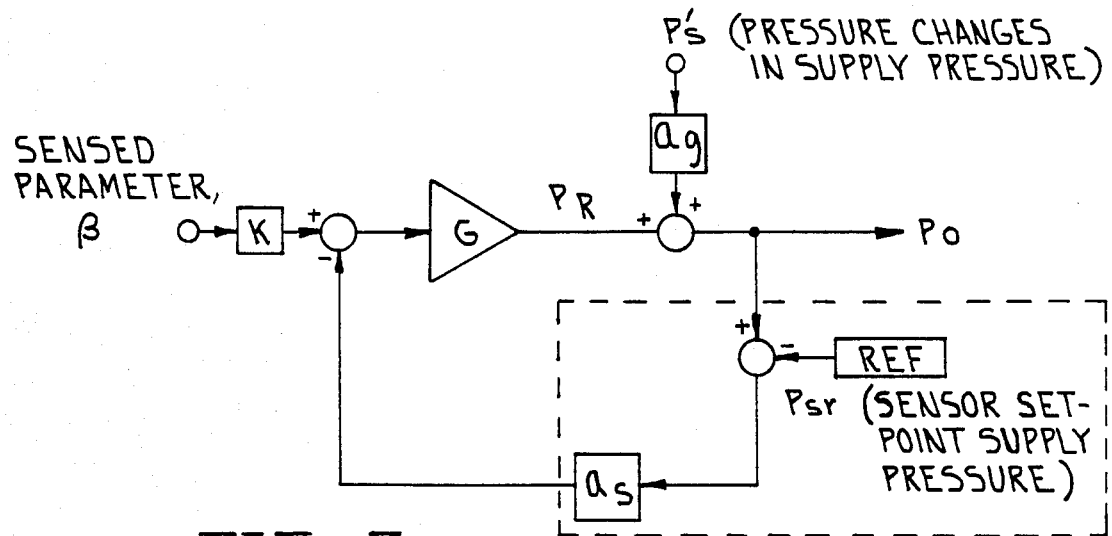
FIG. 7 shows a control system block diagram of the closed loop sensor circuit shown in FIG. 5.

The closed loop arrangement in FIG. 5 can be shown schematically in a control system block diagram as shown in FIG. 7. K represents the sensitivity of the fluidic sensor, $P_R$ the static recovered output pressure of the gainblock, $P_s'$ the gainblock supply pressure disturbance and $P_{sr}$ the sensor set point supply pressure. The slopes of the sensor null offset curve and gainblock null offset curve are $a_s$ and $a_g$ respectively. It can be seen from FIG. 7 that the sensor performs a dual role. Not only does it perform its normal function as sensor but also acts as a reference comparator scaler in the feedback loop.

Figure 8:
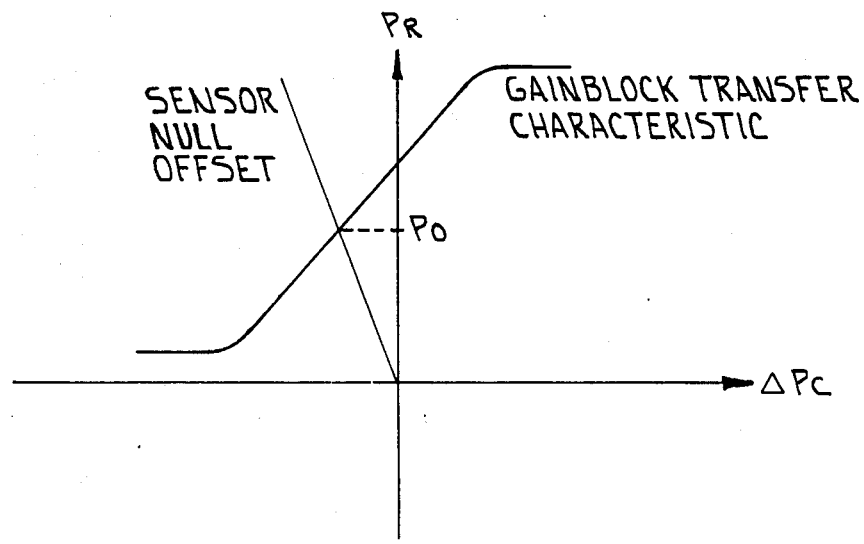
FIG. 8 shows the superimposed null offset characteristics of the sensor offset, FIG. 2, and single sided gain section offset of FIG. 6.

The null balance circuit operating point is determined by simultaneous solution of the sensor and gainblock null offset characteristics. FIG. 8 shows the superimposed null offset characteristics of the sensor offset (FIG. 2) and single sided gain block offset (FIG. 6) indicating a null balance operating point $P_0$.

Note that to overlay the sensor offset of FIG. 2 onto FIG. 8, the axis has been rotated one quadrant.

To develop the output equations for the open and closed loop systems, assume that a rate input, $\beta$, is applied to the sensors. This causes a change in the differential output pressure, $\Delta P_c$. This change combined with the $\Delta P_c$ due to null offset defines a new system operating point $P_0$. The change in system output is a measure of the applied input.

If an output equation is now developed for the system diagrams shown in FIGS. 1 and 7 the advantages of the closed loop operation may be seen.

In the closed loop system from FIG. 7

$$P_0 = \left(\frac{G}{1+a_sG}\right)K\beta - \left(\frac{a_sG}{1+a_sG}\right)P_{sr} + \left(\frac{a_g}{1+a_sG}\right)P_s' \quad (2)$$

For the open loop system from FIG. 1

$$P_0 = GK\beta + P_s'(a_sG + a_g) \quad (3)$$

The third term in (2) and the second term in (3) result from changes in $P_s$, the supply pressure.

Forming a ratio of $\beta$, dependent terms from equations (2) and (3), ie the closed loop sensitivity/open sensitivity equals $$\frac{\frac{G}{1+a_sG}}{G} \text{ or } \frac{1}{1+a_sG} \quad (4)$$

So for the closed loop arrangement, the sensitivity to $\beta$ or reduction in open loop gain, is reduced by the factor $(1+a_sG)$. However, sensitivity to pressure disturbance has been decreased.

By forming a ratio of the $P_s'$ terms in the two equations the ratio of the relative signal error suppression is defined as:

$$\frac{a_g}{1+a_sG} \cdot \frac{1}{a_g + a_sG} \simeq \frac{a_g}{(a_sG)^2} \quad (5)$$

for $a_sG \ll 1$ and $a_sG < 1$

It can be seen that the suppression of supply pressure variations or supply noise, $P_s'$, is greater in the closed loop case since $$\frac{a_g}{(a_sG)^2} \ll 1$$

However, some system sensitivity has been sacrificed.

The improvement in signal-to-noise, S/N, i.e., the ratio of closed loop S/N to open loop S/N is equal to $$\left(1 + \frac{a_s}{a_g}G\right) \quad (6)$$

In most cases the null offset slope of the sensor, $a_s$ is usually much less than the null offset slope, $a_g$, of cascaded amplifiers. Nevertheless, the closed loop offers an advantage because $a_sG \gg 1$.

Enhanced frequency response is also obtained in the null balance approach. If the fluidic gain block is characterized by a gain term and a simple lag then in the closed loop arrangement the lag is reduced by the factor $(1+a_sG)$. Substituting $$\frac{G}{(\tau S + 1)}$$

for G in the rate dependent term in equation (2).

$$\frac{\left(\frac{G}{\tau S + 1}\right) K\beta}{1 + \left(\frac{a_s G}{\tau S + 1}\right)} = \frac{\left(\frac{GK\beta}{1 + a_s G}\right)}{\left(\frac{\tau}{1 + a_s G}\right) S + 1} \quad (7)$$

The system's characteristic equation is obtained $$\left(\frac{\tau}{1 + a_s G}\right) S + 1 \quad (8)$$

Equation (7) shows that the closed loop time constant, defined here as $\tau^1$ is equal to the open loop time constant, $\tau$, divided by $1 + a_s G$ or $$\tau^1 = \frac{\tau}{1 + a_s G}$$

As shown earlier $a_s G \gg 1$. Thus a significant increase in frquency response is offered by a closed-loop approach. This follows from the fact that there has been a reduction in open loop sensitivity.

Figure 9:
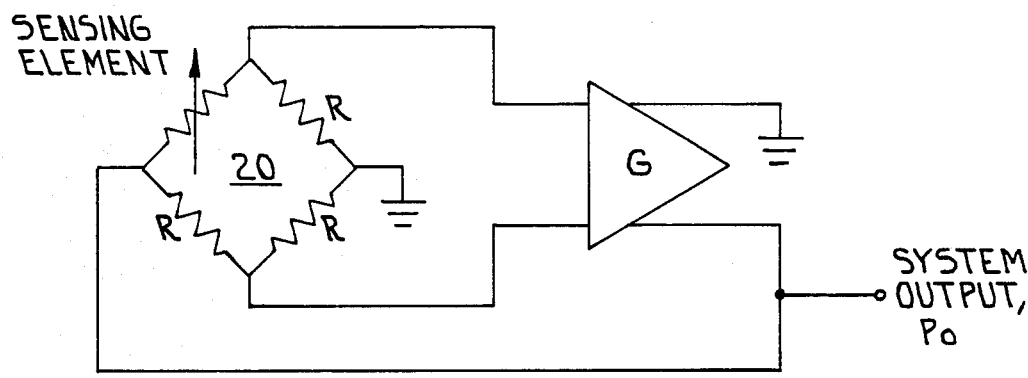
FIG. 9 shows a schematic of a closed loop fluidic sensing circuit, which uses a wheatstone bridge as the sensing element, as an alternate embodiment of the present invention.

The null balance closed loop approach may be applied to a number of actual fluidic sensors. The laminar jet angular rate sensor (LJARS) is one of the more obvious choices, but as shown in FIG. 9, a wheatstone bridge 20 may also be used in a null balance configuration. An alternate approach shown in FIG. 10 uses a single sensing element 30, a variable resistance, for example, in series with a fluidic set point sensor 31. Use of a set point sensor 31 allows the DC pressure level from the sensing element 30 to be converted into a differential pressure. System output, $P_0$, in this case, is the effort required to maintain a constant $P_1$. FIG. 11 shows a set point sensor characteristic with the constant $P_1$ zero crossing point 32.

Figure 10:
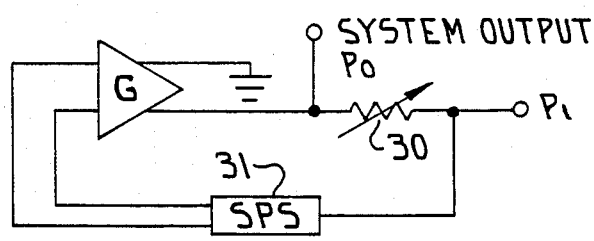
FIG. 10 shows a schematic of a closed loop fluidic sensing circuit, which uses a set point sensor as the sensing element, as an alternate embodiment of the present invention.
Figure 11:
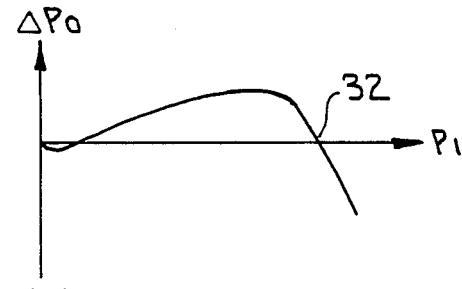
FIG. 11 shows a typical set point sensor output characteristic.

Note that the circuit in FIG. 10 without a sensing element becomes a pressure regulator.

Figure 12:
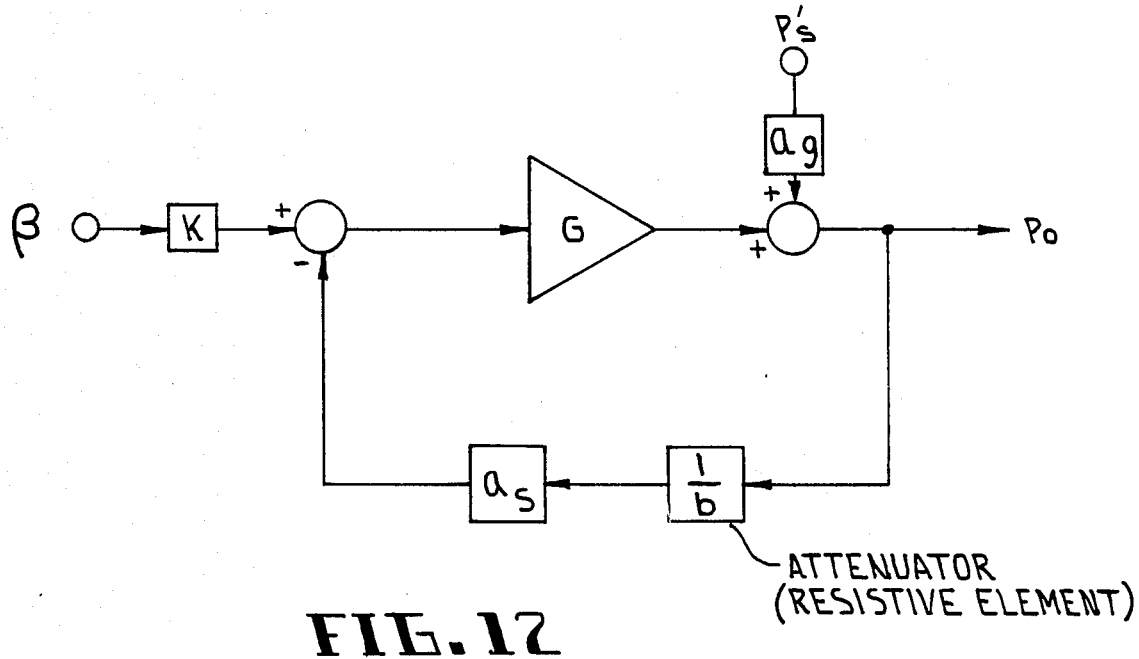
FIG. 12 shows a control system block diagram with an attenuator in the feedback loop as an alternate embodiment of the present invention.

As explained earlier the sensitivity of the closed loop sensor has been decreased. This is due to the fact that the sensitivity is proportional to the reciprocal of the slope or coeficient, $a_s$, and as a result, the larger $a_s$, the lower the sensitivity. Nevertheless, the advantage of a larger $a_s$ outweighs the sensitivity reduction and should not be left to manufacturing change and variation. A large $a_s$ may be externally generated by placing unbalanced resistors on the control ports of the sensor or by using a set point sensor that drives the sensing element. In either case, an $a_s$ externally generated is more controllable and the sensor operating point remains essentially constant for an applied stimulus if $a_s$ is large. However, to regain sensitivity, the circuit can be modified by placing an inine resistor between the output amplifier's single sided output and the input to the sensor. As shown in FIG. 12 the output is taken between the amplifier and the attenuator input. The apparent $a_s$ is now the actual $a_s$ divided by the magnitude of the attenuator. Thus, the sensitivity of the closed loop system is not only restored but made more controllable and the supply operating point can be held more constant.

Obviously, numerous modifications and variations of the present invention are possible in light of the above teachings. It is therefore to be understood that within the scope of the appended claims the invention may be practiced otherwise than as specifically described herein.

I claim:

1. A fluidic system for sensing an input stimulus comprising: a fluid sensor, said sensor having a supply input and first and second outputs for indicating a differential fluidic signal as a function of the input stimulus;
   a fluidic amplifier, said amplifier having means for receiving a pressurized supply of fluid; means for receiving said differential signal from said sensor; a system output connected to said supply input of said sensor for passing an amplified system output signal to said supply input of said sensor; and
   means for measuring the system output signal, whereby said system output signal is a function of said input stimulus and is less susceptible to pressure variations in said pressurized supply of fluid.

2. The fluidic system as recited in claim 1 wherein said amplifier further comprises a second output connected to a system ground.

3. The fluidic system as recited in claim 1 wherein said sensor is a laminar jet angular rate sensor.

4. The fluidic system as recited in claim 1 wherein said sensor is a fluidic set point sensor and said system output is connected to said supply input of said sensor through a variable fluidic resistor.

5. The fluidic system as recited in claim 1 further comprising means for attenuating said system output, connected between said system output of said amplifier and said supply input of said sensor.

6. The fluidic system as recited in claim 1 wherein said sensor is a fluidic bridge sensor.

7. A fluidic system for sensing an input stimulus comprising:
   means for sensing and indicating a differential fluidic output as a function of the input stimulus;
   means for amplifing the differential fluidic output of said sensing means and supplying a single system output signal, as a function of the differential fluidic output, to said sensing means;
   means for supplying a pressurized jet of fluid to said amplifing means; and
   means for measuring said single system output whereby said output signal is a function of said input stimulus and is less susceptible to pressure variation of said pressurized jet of fluid.

* * * * *